(12) United States Patent
Zhang et al.

(10) Patent No.: US 12,219,516 B2
(45) Date of Patent: Feb. 4, 2025

(54) METHOD AND APPARATUS FOR REGISTRATION

(71) Applicant: Telefonaktiebolaget LM Ericsson (publ), Stockholm (SE)

(72) Inventors: Fengpei Zhang, Guangzhou (CN); Sandeep Akhouri, Guangzhou (CN); Yun Zhang, Guangzhou (CN)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 602 days.

(21) Appl. No.: 17/613,541

(22) PCT Filed: May 21, 2020

(86) PCT No.: PCT/CN2020/091595
§ 371 (c)(1),
(2) Date: Nov. 23, 2021

(87) PCT Pub. No.: WO2020/238756
PCT Pub. Date: Dec. 3, 2020

(65) Prior Publication Data
US 2022/0174637 A1  Jun. 2, 2022

(51) Int. Cl.
*H04W 60/00* (2009.01)
*H04W 4/70* (2018.01)
*H04W 8/20* (2009.01)

(52) U.S. Cl.
CPC ............. *H04W 60/00* (2013.01); *H04W 4/70* (2018.02); *H04W 8/20* (2013.01)

(58) Field of Classification Search
CPC .............................. H04W 64/00; H04W 60/00
USPC ......................................................... 455/435.1
See application file for complete search history.

(56) References Cited

U.S. PATENT DOCUMENTS

| 2012/0220326 A1* | 8/2012 | Li ........................... H04W 8/22 455/517 |
|---|---|---|
| 2019/0037516 A1 | 1/2019 | Kim et al. |

FOREIGN PATENT DOCUMENTS

| WO | 2018234511 A1 | 12/2018 |
|---|---|---|
| WO | 2019068898 A3 | 4/2019 |
| WO | 2019098623 A1 | 5/2019 |

OTHER PUBLICATIONS

EPO Communication with Supplementary European Search Report dated May 26, 2023 for Patent Application No. 20815213.2, consisting of 22-pages.

(Continued)

*Primary Examiner* — Qutbuddin Ghulamali
(74) *Attorney, Agent, or Firm* — Weisberg I.P. Law, P.A.

(57) ABSTRACT

Embodiments of the present disclosure provide methods and apparatuses for registration. A method at a network exposure function entity of a network comprises determining that a user equipment (UE) has attached to the network; and sending a UE reachability notification including an identifier of the UE to a gateway device, wherein the UE reachability notification can be used by the gateway device to send a registration update request to a server in which the UE has registered.

16 Claims, 9 Drawing Sheets

(56) References Cited

OTHER PUBLICATIONS

SA WG2 Temporary Document; SA WG2 Meeting #123 S2-178173 (revision of S2-176995, 7596, 7967, 8121, 8149); Title: Finalizing the UE Reachability Procedure with RRC Inactive handling (OI#13); Agenda Item: 6.5.7.5.; Source: Ericsson; Work Item/Release: 5GS_ph1 / Rel-15; Document for: Approval; Date and Location: Oct. 23-27, 2017, Ljubljana, Slovenia, consisting of 5-pages.

3rd Generation Partnership Project, "Technical Specification Group Services and System Aspects; Procedures for the 5G System; Stage 2 (Release 16)", 3GPP TS 23.502 V16.0.2, Apr. 2019, pp. 1-419.

Huawei et al., "Procedures for solution 14 to key issue 9", 3GPP TSG-SA WG2 Meeting #130, Jan. 21-25, 2019, pp. 1-7, Kochi, India, S2-1901274, pp. 1-7.

Open Mobile Alliance, "Lightweight Machine to Machine Technical Specification Core", Candidate Version: 1.1, Jun. 12, 2018, pp. 1-142.

Open Mobile Alliance, "Lightweight Machine to Machine Technical Specification Transport Bindings", Candidate Version: 1.1, Jun. 12, 2018, pp. 1-67.

3rd Generation Partnership Project, "Technical Specification Group Core Network and Terminals; T8 reference point for Northbound APIs (Release 15)", 3GPP TS 29.122 V2.0.0, Jun. 2018, pp. 1-244.

3rd Generation Partnership Project, "Technical Specification Group Services and System Aspects; Architecture enhancements to facilitate communications with packet data networks and application (Release 15)", 3GPP TS 23.682 V15.4.0, Mar. 2018, pp. 1-123.

3rd Generation Partnership Project, "Technical Specification Group Services and System Aspects; Study on Cellular Internet of Things (IoT) support and evolution for the 5G System (Release 16)", 3GPP TR 23.724 V16.0.0, Dec. 2018, pp. 1-262.

* cited by examiner

100

| Server 104 | Gateway device 108 | Network exposure function entity 102 | UE 106 |

Receiving a Non-IP data delivery (NIDD) configuration request for setting up a NIDD channel for the UE from the gateway device

204

Sending a NIDD configuration response to the gateway device

206

Receiving a monitoring event configuration request associated with the UE from the gateway device

208

Sending a monitoring event configuration response to the gateway device

FIG. 2

METHOD AND APPARATUS FOR REGISTRATION

TECHNICAL FIELD

The non-limiting and exemplary embodiments of the present disclosure generally relate to the technical field of communications, and specifically to methods and apparatuses for registration.

BACKGROUND

This section introduces aspects that may facilitate a better understanding of the disclosure. Accordingly, the statements of this section are to be read in this light and are not to be understood as admissions about what is in the prior art or what is not in the prior art.

In a communication network such as 3rd Generation Partnership Project (3GPP) network, a network exposure function entity such as service capability exposure function (SCEF) or network exposure function (NEF) provides a means to securely expose the services and capabilities provided by 3GPP network. The detail of SCEF has been defined in 3GPP TS 23.682 V16.1.0, the disclosure of which is incorporated by reference herein in its entirety. The detail of NEF has been defined in 3GPP TS 23.501 V16.0.2, the disclosure of which is incorporated by reference herein in its entirety. NEF inherits the functions from SCEF.

In order for Internet of Things (IoT) devices to directly connect to a broadband cellular network, 3GPP has embraced several LPWA (Low Power Wide Area) technologies, such as narrowband IoT (NB-IoT), category M1(CAT-M1), etc. to address the requirements of low power and long battery life. The power-hungry protocol for establishing Internet protocol (IP) data bearers has been replaced by extending a non-access stratum (NAS) protocol to allow small amounts of data to be transferred over a control plane. This type of data transfer has been named as Non-IP Data Delivery (NIDD). The path for NIDD between a user equipment (UE) and a server such as a service capability server/an application server (SCS/AS) or an application function (AF) entity is defined to traverse various network devices such as Mobility Management Entity (MME) and SCEF.

Open mobile alliance (OMA) lightweight machine to machine (M2M) technical specification version 1.1 has defined an LwM2M protocol designed for sensor networks to meet the demands of the M2M environment. With the LwM2M protocol, it can manage lightweight and low power devices on a variety of networks to realize the potential of IoT. The LwM2M protocol is designed for both remote management of IoT devices and related service enablement functions. It features a modern architectural design based on representational state transfer (REST) and defines an extensible resource and data model. The LwM2M protocol is built on top of an Internet Engineering Task Force (IEFT) standard called Constrained Application Protocol (CoAP). The LwM2M protocol is based on IEFT protocols and security standards.

OMA LwM2M technical specification version 1.1 defines an application layer communication protocol between a server and a client. The LwM2M protocol stack utilizes the IEFT CoAP as an underlying transport protocol over User Datagram Protocol (UDP), Datagram Transport Layer Security (DTLS) over UDP, Transmission Control Protocol (TCP), Transport Layer Security (TLS) over TCP, Short Message Service (SMS), DTLS over SMS or Non-Internet protocol (Non-IP) (includes 3GPP Cellular Internet of Things (CIoT) and LoRaWAN).

LwM2M technical specification version 1.1 defines a simple resource model where each piece of information made available by an LwM2M client is a resource. Resources are logically organized into objects. The LwM2M client can have many resources and each resource belongs to an object. Resources and objects have the capability to support multiple instances. A resource may have multiple instances referred to as a Resource Instance. The LwM2M server supports several operations such as create, read, update and delete. The LwM2M client also has the capability to instantiate a resource instance.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Even though the latest LwM2M technical specification version 1.1 adds a Non-IP binding to support devices operating in LPWA networks, it does not provide any optimizations to support standard operations such as registration of devices operating in LPWA networks. For example, there is a duplication of functionality involving 3GPP SCEF/NEF and LwM2M Server as devices should be registered in SCEF/NEF and also registered in the LwM2M Server. For example, there are some issues on LwM2M registration over NIDD binding. For a LWPA device, it usually goes to power saving mode periodically. This might result in registration not being successful if multiple round trips are required to complete the registration. If the associated security modes are used with the registration, then the DTLS handshake adds an overhead for the handshake. Every time when a LWPA device wakes up, it will do a register update to tell the LwM2M server about its latest status, which will generate signaling overhead and power consumption from the LWPA device. In addition, in the registration message, the endpoint attribute of the device is specified by the device itself which is not secure enough.

To overcome or mitigate at least one above mentioned problems or other problems or provide a useful solution, the embodiments of the present disclosure propose an improved registration solution. The proposed solution according to embodiments of the disclosure can leverage the registration functionality of devices in a network exposure function entity such as SCEF/NEF and automatically register the devices in the server such as LwM2M server. Therefore, devices that are registered in the network exposure function entity such as SCEF/NEF can automatically be registered in the server such as LwM2M server without going through the entire registration process.

In a first aspect of the disclosure, there is provided a method at a network exposure function entity of a network. The method comprises determining that a user equipment (UE) has attached to the network; and sending a UE reachability notification including an identifier of the UE to a gateway device, wherein the UE reachability notification can be used by the gateway device to send a registration update request to a server in which the UE has registered.

In an embodiment, the UE reachability notification further may include a reachability type and/or a validity time.

In an embodiment, the reachability type may indicate reachability for data.

In an embodiment, a lifetime of the registration included in the registration update request reachability type may be set as the validity time.

In an embodiment, the method according to the first aspect of the disclosure may further comprise receiving a registration request without an identifier of the UE from the UE; sending the registration request together with the identifier of the UE to the gateway device, wherein the identifier of the UE is added by the gateway device into the registration request and the registration request including the identifier of the UE is sent by the gateway device to the server; receiving a registration response from the gateway device; and sending the registration response to the UE.

In an embodiment, the registration request further may include a binding mode of Non-Internet protocol (Non-IP), a lifetime of the registration and a payload.

In an embodiment, a lifetime of the registration included in the registration request may be set as a predefined value indicating that the lifetime is infinity.

In an embodiment, the predefined value may be 0.

In an embodiment, the method according to the first aspect of the disclosure may further comprise receiving a Non-IP data delivery (NIDD) configuration request for setting up a NIDD channel for the UE from the gateway device; sending a NIDD configuration response to the gateway device; receiving a monitoring event configuration request associated with the UE from the gateway device; and sending a monitoring event configuration response to the gateway device.

In an embodiment, the UE may be a Lightweight Machine to Machine (LwM2M) device, the network exposure function entity may be a service capability exposure function (SCEF) entity or a network exposure function (NEF) entity and the gateway device may be an LwM2M gateway device.

In an embodiment, the LwM2M gateway device may be included in a server.

In an embodiment, the identifier of the UE may be a Mobile Station International Subscriber Directory Number (MSISDN).

In a second aspect of the disclosure, there is provided a method at a gateway device. The method comprises receiving a user equipment (UE) reachability notification including an identifier of the UE from a network exposure function entity; and sending a registration update request to a server in which the UE has registered.

In an embodiment, the method according to the second aspect of the disclosure may further comprise receiving a registration request together with an identifier of the UE from a network exposure function entity, adding the identifier of the UE into the registration request; sending the registration request including the identifier of the UE to the server; receiving a registration response from the server; and sending the registration response to the network exposure function entity.

In an embodiment, the method according to the second aspect of the disclosure may further comprise receiving an on-boarding device request for on-boarding the UE from the server, wherein the on-boarding device request includes the identifier of the UE and the server's uniform resource locator (URL); sending a Non-IP data delivery (NIDD) configuration request for setting up a NIDD channel for the UE to the gateway device; receiving a NIDD configuration response from the gateway device; sending a monitoring event configuration request associated with the UE to the gateway device; receiving a monitoring event configuration response from the gateway device; and sending an on-boarding device response to the server.

In a third aspect of the disclosure, there is provided an apparatus implemented at a network exposure function entity. The apparatus comprises a processor; and a memory coupled to the processor, said memory containing instructions executable by said processor, whereby said apparatus is operative to determine that a user equipment (UE) has attached to the network; and send a UE reachability notification including an identifier of the UE to a gateway device, wherein the UE reachability notification can be used by the gateway device to send a registration update request to a server in which the UE has registered.

In a fourth aspect of the disclosure, there is provided an apparatus implemented at a gateway device. The apparatus comprises a processor; and a memory coupled to the processor, said memory containing instructions executable by said processor, whereby said apparatus is operative to receive a user equipment (UE) reachability notification including an identifier of the UE from a network exposure function entity; and send a registration update request to a server in which the UE has registered.

In a fifth aspect of the disclosure, there is provided a computer program product, comprising instructions which, when executed on at least one processor, cause the at least one processor to carry out the method according to the first aspect of the disclosure.

In a sixth aspect of the disclosure, there is provided a computer program product, comprising instructions which, when executed on at least one processor, cause the at least one processor to carry out the method according to the second aspect of the disclosure.

In a seventh aspect of the disclosure, there is provided a computer-readable storage medium storing instructions which when executed by at least one processor, cause the at least one processor to carry out the method according to the first aspect of the disclosure.

In an eighth aspect of the disclosure, there is provided a computer-readable storage medium storing instructions which when executed by at least one processor, cause the at least one processor to carry out the method according to the second aspect of the disclosure.

Many advantages may be achieved by applying the proposed solution according to some embodiments of the present disclosure. For example, in some embodiments of the present disclosure, the proposed solution can reduce "chattiness" over low power and lossy networks, which can provide significant improvements in terms of performance and reliability. In some embodiments of the present disclosure, the proposed solution can prevent several round trips for successful completion of some operation such as registration update operation. In some embodiments of the present disclosure, if security is enabled, the proposed solution can enable that the message exchange is performed in a time sensitive manner to avoid re-transmissions and duplicates. In some embodiments of the present disclosure, the proposed solution can be beneficial to the constrained network and device settings such as sleepy devices operating on battery in a NB-IoT network. In some embodiments of the present disclosure, the proposed solution can enable reduce multiple round-trips and message exchanges to perform standard operations by optimizing network assets and leveraging existing capabilities when these exist. In some embodiments of the present disclosure, the proposed solution can simplify the implementation complexity on the device.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 1 schematically shows a system, in which some embodiments of the present disclosure can be implemented;

FIG. 2 shows a flowchart of a method according to an embodiment of the present disclosure;

DETAILED DESCRIPTION

Figure 3:
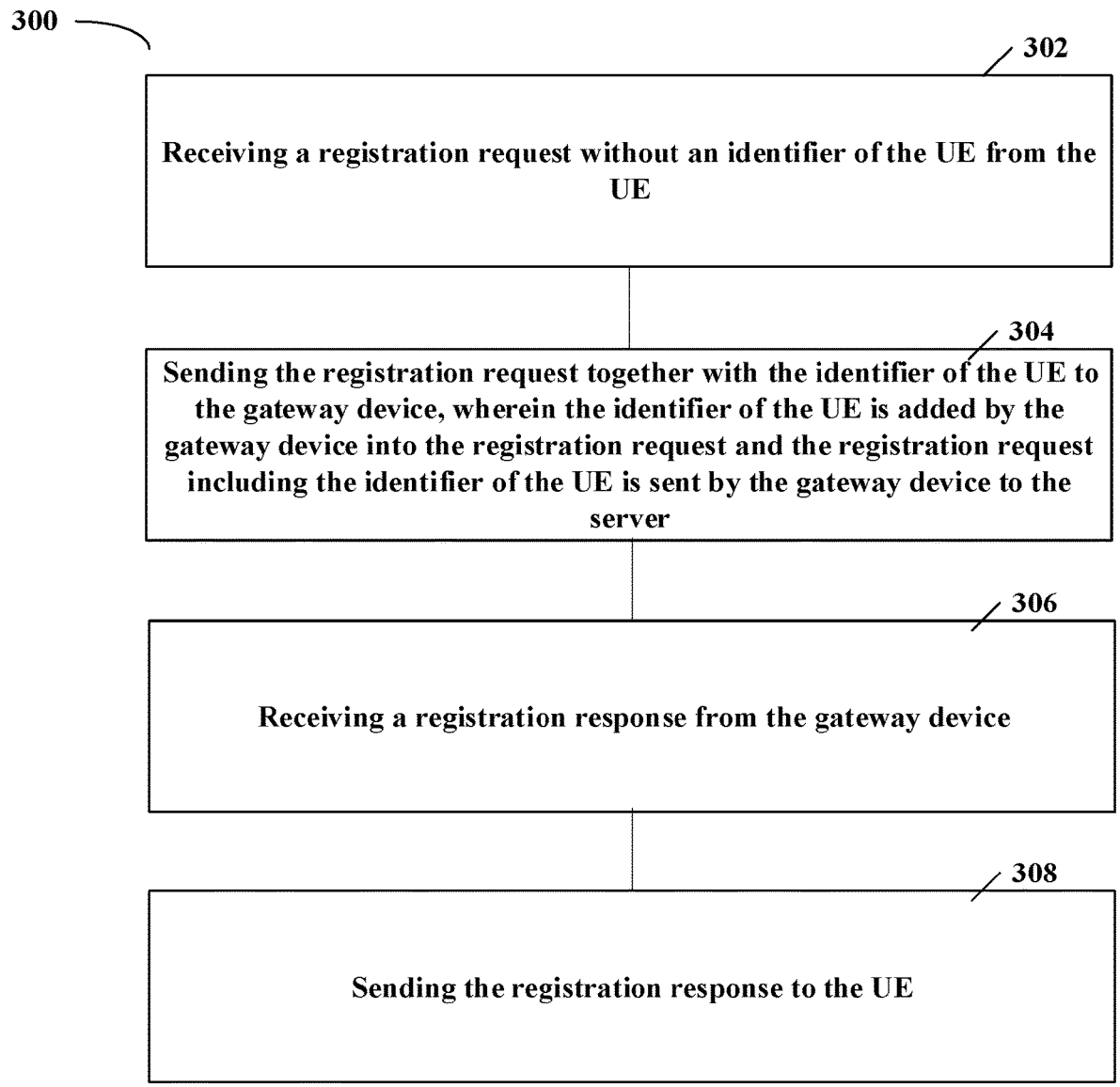
FIG. 3 shows a flowchart of a method according to another embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards, such as LTE-Advanced (LTE-A), LTE, new radio (NR) and so on. In the following description, the terms "network" and "system" can be used interchangeably. Furthermore, the communications between a terminal device and a network device in the wireless network may be performed according to any suitable generation communication protocols, including, but not limited to fourth generation (4G) communication protocols such as LTE, fifth generation (5G) communication protocols such as NR, and/or any other protocols either currently known or to be developed in the future.

The term "network device" refers to a network device in a communication network via which a terminal device accesses to the network and receives services therefrom. For example, in a communication network such as a 3GPP-type cellular network, the network device may comprise access network device and core network device. For example, the access network device may comprise base station (BS), an Integrated Access and Backhaul (IAB) node, an access point (AP), a multi-cell/multicast coordination entity (MCE), etc. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth. The core network device may comprise a plurality of network devices which may offer numerous services to the customers who are interconnected by the access network device. Each access network device is connectable to the core network device over a wired or wireless connection.

The term "network function (NF)" refers to any suitable function which can be implemented in a network device of a communication network. For example, in 5G network, the network function may comprise a plurality of NFs such as Authentication Server Function (AUSF), AMF, Data Network (DN) (e.g. operator services, Internet access or 3rd party services), Network Exposure Function (NEF), Network Repository Function (NRF), Network Slice Selection Function (NSSF), Policy Control Function (PCF), Session Management Function (SMF), Unified Data Management (UDM), User Plane Function (UPF), Application Function (AF), UE, (Radio) Access Network ((R)AN), 5G-Equipment Identity Register (5G-EIR), Security Edge Protection Proxy (SEPP), Network Data Analytics Function (NWDAF), Unified Data Repository (UDR), Unstructured Data Storage Function (UDSF), etc.

The term "terminal device" refers to any end device that can access a communication network and receive services therefrom. By way of example and not limitation, in the communication network, the terminal device may refer to a mobile terminal, a UE, or other suitable devices. The terminal device may be, for example, a Subscriber Station (SS), a Portable Subscriber Station, a Mobile Station (MS), or an Access Terminal (AT). The terminal device may include, but not limited to, a portable computer, an image capture device such as a digital camera, a gaming terminal device, a music storage and a playback appliance, a mobile phone, a cellular phone, a smart phone, a voice over IP (VoIP) phone, a wireless local loop phone, a tablet, a wearable device, a personal digital assistant (PDA), a portable computer, a desktop computer, a wearable device, a vehicle-mounted wireless device, a wireless endpoint, a mobile station, a laptop-embedded equipment (LEE), a laptop-mounted equipment (LME), a USB dongle, a smart device, a wireless customer-premises equipment (CPE) and the like. In the following description, the terms "terminal device", "terminal", "user equipment" and "UE" may be used interchangeably. As one example, a UE may represent a terminal device configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a UE may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The UE may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a UE may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Please note that the terms "network exposure function entity", "gateway device", and "server", etc. as used in this document are used only for ease of description and differentiation among nodes or devices, etc. With the development of the technology, other terms with the similar/same meanings may also be used.

FIG. 1 schematically shows a system 100, in which some embodiments of the present disclosure can be implemented. As shown in FIG. 1, the system 100 may comprise a network exposure function entity 102. The network exposure function entity 102 can provide a means to securely expose the services and capabilities provided by a network such as 3GPP network. For example, in the 4G network, the functionalities of the network exposure function entity 102 may be similar to SCEF. In the 5G network, the functionalities of the network exposure function entity 102 may be similar to NEF. Though only one network exposure function entity 102 is shown in FIG. 1, there may be any other suitable number of network exposure function entities in the system 100 in other embodiments. For example, there may be a centralized network exposure function entity, one or more network slice network exposure function entities, one or more edge site level network exposure function entities, and one or more region level network exposure function entities, etc. These network exposure function entities can be assigned with different roles.

The system 100 may further comprise a server 104 which can provide various services to the UE 106. For example, the server 104 may be SCS/AS or AF. The server 104 can interact with relevant NFs and UE via the network exposure function entity such as SCEF or NEF. The server 104 can be implemented in form of hardware, software or their combination. The server 104 may run with any kind of operating system including, but not limited to, Windows, Linux, UNIX and their variants. It is noted that the system 100 can include two or more servers 104 though only one server 104 is shown in FIG. 1. For example, the two or more servers 104 can perform functionality corporately. Alternatively each server may be assigned with different functionality and serve a set of UEs.

The system 100 may further comprise a UE 106. The UE 106 may run with any kind of operating system including, but not limited to, Windows, Linux, UNIX, Android, iOS and their variants. It is noted that the system 100 can include two or more UEs 106 though only one UE 106 is shown in FIG. 1. For example, the server 104 can serve a plurality of UEs. The server 104 in one network slice can serve the UEs that have registered in the one network slice. The server 104 supporting a specific service can serve the UEs related to the specific service.

The system 100 may further comprise a gateway device 108 which can provide various services to be described in the following. The gateway device 108 can interconnect the server 104 and the network exposure function entity 102. The gateway device 108 can be implemented in form of hardware, software or their combination. It is noted that the system 100 can include two or more gateway devices 108 though only one gateway device 108 is shown in FIG. 1. For example, two or more servers 104 can use one gateway device 108 or each server 104 may have a corresponding gateway device 108.

Although the subject matter described herein may be implemented in any appropriate type of system using any suitable components, the embodiments disclosed herein are described in relation to a communication system complied with the exemplary system architecture illustrated in FIG. 1. For simplicity, the system architecture of FIG. 1 only depicts some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 2 shows a flowchart of a method 200 according to an embodiment of the present disclosure, which may be performed by an apparatus implemented in or at a network exposure function entity of a network such as NEF or SCEF or communicatively coupled to the network exposure function entity of the network such as NEF or SCEF. As such, the apparatus may provide means for accomplishing various parts of the method 200 as well as means for accomplishing other processes in conjunction with other components.

At block 202, the network exposure function entity such as NEF or SCEF receives a Non-IP data delivery (NIDD) configuration request for setting up a NIDD channel for a UE from a gateway device. The NIDD configuration request may be any suitable NIDD configuration request for example depending on the specific network. The network exposure function entity such as NEF or SCEF may receive the NIDD configuration request for example when a server wants to on-board the UE. For example, the server may send an on-board device request including an identifier of the UE such as MSISDN and the server's URL to the gateway device, and then the gateway device may send a NIDD configuration request for setting up the NIDD channel for the UE to the network exposure function entity. For example, LwM2M application can on-board a Non-IP device as LwM2M client by sending an on-board device request including the MSISDN of the Non-IP device and LwM2M server URL to a LwM2M gateway, and then the LwM2M Gateway can send the NIDD Configuration Request to the network exposure function entity such as SCEF/NEF in order to set up NIDD channel for the UE.

At block 204, the network exposure function entity such as NEF or SCEF sends a NIDD configuration response to the gateway device. The NIDD configuration operation in blocks 202 and 204 may be similar to the NIDD configuration as defined in 3GPP TS 23.502 V16.0.2, the disclosure of which is incorporated by reference herein in its entirety.

At block 206, the network exposure function entity such as NEF or SCEF receives a monitoring event configuration request associated with the UE from the gateway device. The monitoring event configuration request can be used by the gateway device to subscribe to or modify event reporting for the UE. The monitoring event configuration request may be any suitable monitoring event configuration request for example depending on the specific network.

At block 208, the network exposure function entity such as NEF or SCEF sends a monitoring event configuration response to the gateway device. For example, the monitoring event configuration operation in blocks 206 and 208 may be similar to Nnef_EventExposure_Subscribe operation as defined in 3GPP TS 23.502 V16.0.2.

FIG. 3 shows a flowchart of a method 300 according to an embodiment of the present disclosure, which may be performed by an apparatus implemented in or at a network exposure function entity of a network such as NEF or SCEF or communicatively coupled to the network exposure function entity of the network such as NEF or SCEF. As such, the apparatus may provide means for accomplishing various parts of the method 300 as well as means for accomplishing other processes in conjunction with other components.

At block 302, the network exposure function entity such as NEF or SCEF receives a registration request without an identifier of the UE from the UE. The identifier of the UE may be any identifier which can uniquely identify the UE. For example, the identifier of the UE may be a subscriber number of the UE such as a Mobile Station International Subscriber Directory Number (MSISDN). The registration request can be any suitable registration request for example depending on the specific application scenario. For example, in LwM2M, a LwM2M client can send a "Register" operation to the LwM2M server with registration parameters such as query string parameters and Object and Object Instances included in the payload. For example, Register Operation URL based on CoAP POST may be "/rd?ep={Endpoint Client Name} & lt={Lifetime} & lwm2m={version} & b={binding} & Q & sms={MSISDN}" as described in OMA LwM2M technical specification version 1.1. Different from the OMA LwM2M technical specification version 1.1, in this embodiment, the Register Operation URL based on CoAP POST does not include the parameter "MSISDN".

In an embodiment, the registration request may further include a binding mode of Non-Internet protocol (Non-IP), a lifetime of the registration and a payload. For example, in LwM2M, Non-Internet protocol (Non-IP), the lifetime of the registration and the payload may be similar to those as described in OMA LwM2M technical specification version 1.1.

In an embodiment, the lifetime of the registration included in the registration request may be set as a predefined value indicating that the lifetime is infinity. For example, the predefined value may be 0 or other suitable value.

At block 304, the network exposure function entity such as NEF or SCEF sends the registration request together with the identifier of the UE to the gateway device. The identifier of the UE can be added by the gateway device into the registration request and the registration request including the identifier of the UE can be sent by the gateway device to the server. The network exposure function entity can obtain the identifier of the UE in various ways. For example, the network exposure function entity can obtain the identifier of the UE in various system procedures in the network.

At block 306, the network exposure function entity such as NEF or SCEF receives a registration response from the gateway device. The gateway device can receive the registration response from the server and send it to the network exposure function entity. The registration response may include the registration result such as success or failure. For example, in LwM2M, the registration response may be similar to that as described in OMA LwM2M technical specification version 1.1.

At block 308, the network exposure function entity such as NEF or SCEF sends the registration response to the UE.

The messages in blocks 302, 304, 306 and 308 may be delivered by using NIDD as described in 3GPP TS 23.502 V16.0.2. In addition, the registration procedure may be the normal registration procedure for example as described in OMA LwM2M technical specification version 1.1.

Figure 4:
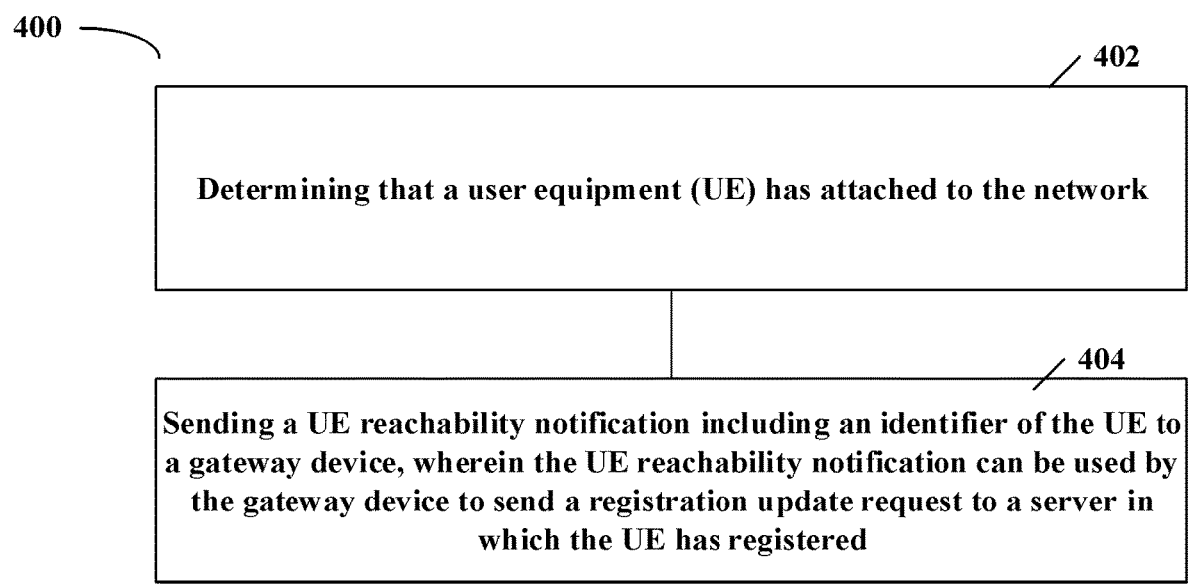
FIG. 4 shows a flowchart of a method according to another embodiment of the present disclosure.

FIG. 4 shows a flowchart of a method 400 according to an embodiment of the present disclosure, which may be performed by an apparatus implemented in or at a network exposure function entity of a network such as NEF or SCEF or communicatively coupled to the network exposure function entity of the network such as NEF or SCEF. As such, the apparatus may provide means for accomplishing various parts of the method 400 as well as means for accomplishing other processes in conjunction with other components.

At block 402, the network exposure function entity such as NEF or SCEF determines that a UE has attached to the network. The network exposure function entity such as NEF or SCEF can subscribe notifications on the UE's reachability from a suitable network device which can provide the UE's reachability information. For example, the network exposure function entity such as NEF or SCEF may subscribe notifications on the UE's reachability via Namf_EventExposure_Subscribe service operation towards the AMF as described in 3GPP TS 23.502 V16.0.2.

At block 404, the network exposure function entity such as NEF or SCEF sends a UE reachability notification including the identifier of the UE to the gateway device. The UE reachability notification may further include any other suitable information such as a reachability type and/or a validity time. In an embodiment, the reachability type may indicate reachability for data. The validity time may be any suitable time value. For example, the validity time may be same as the lifetime of the registration included in the registration request.

In an embodiment, the UE reachability notification can be used by the gateway device to send a registration update request to the server in which the UE has registered. In an embodiment, when the registration update request reachability type includes a lifetime of the registration, the lifetime of the registration may be set as the validity time. In an embodiment, the gateway device can send a registration update request that only refreshes the registration, i.e. the message does not contain any parameters.

In an embodiment, the UE may be an LwM2M device, the network exposure function entity is a SCEF entity or a NEF entity and the gateway device is an LwM2M gateway device.

In an embodiment, the LwM2M gateway device may be included in a server such as LwM2M server. In an embodiment, the LwM2M gateway device may be a standalone device. For example, the LwM2M gateway device may be outside the LwM2M Server or may be inside the LwM2M Server as an internal component. The gateway device may be collocated in the server.

Figure 5:
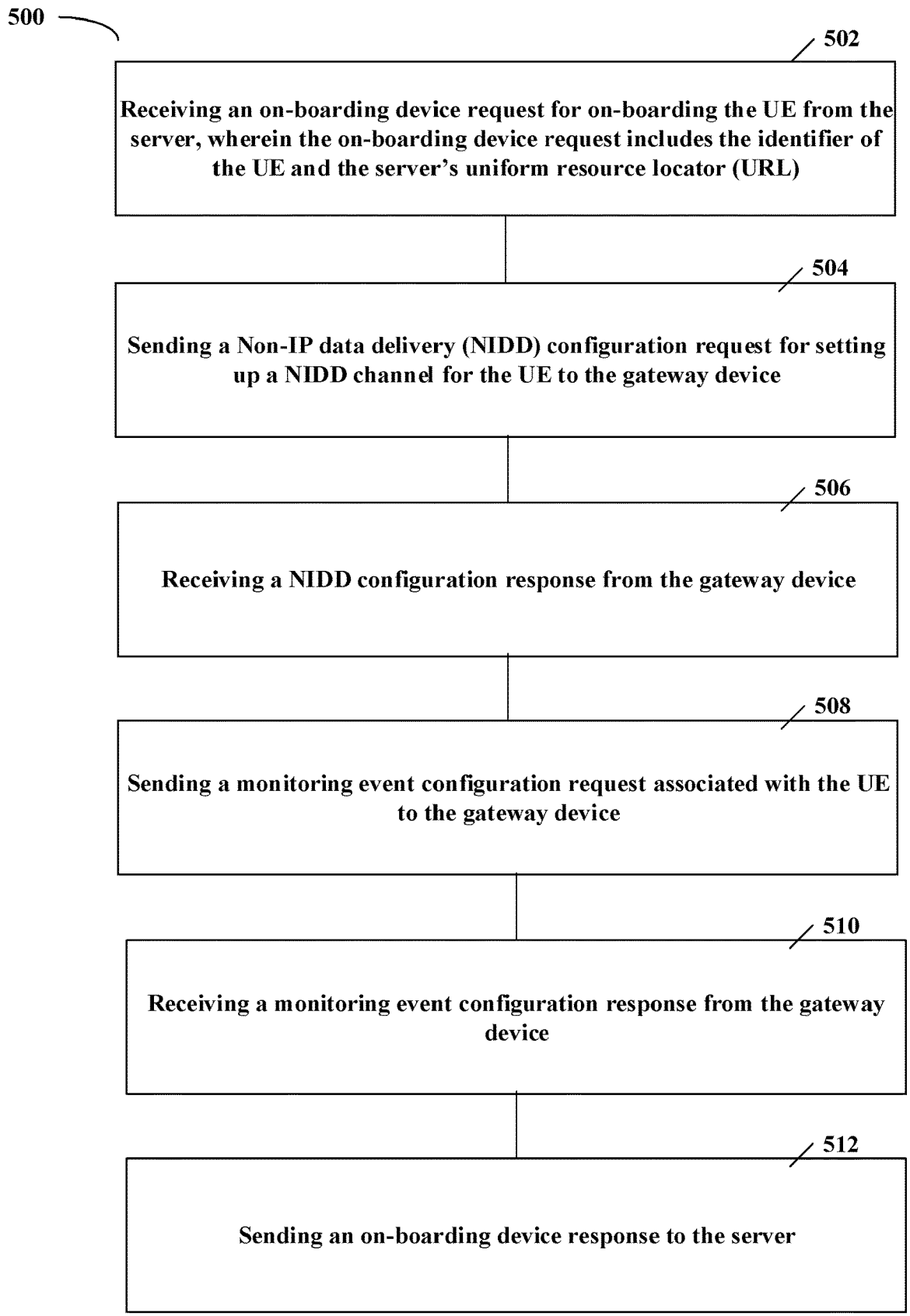
FIG. 5 shows a flowchart of a method according to another embodiment of the present disclosure.

FIG. 5 shows a flowchart of a method 500 according to an embodiment of the present disclosure, which may be performed by an apparatus implemented in or at a gateway device or communicatively coupled to the a gateway device. As such, the apparatus may provide means for accomplishing various parts of the method 500 as well as means for accomplishing other processes in conjunction with other components. Some blocks in FIG. 5 are related to the blocks of FIG. 2. For some parts which have been described in the above embodiments, detailed description thereof is omitted here for brevity.

At block 502, the gateway device receives an on-boarding device request for on-boarding a UE from a server. The on-boarding device request may include any suitable parameters such as an identifier of the UE and the server's uniform resource locator (URL).

At block 504, the gateway device sends a Non-IP data delivery (NIDD) configuration request for setting up a NIDD channel for the UE to the gateway device.

At block 506, the gateway device receives a NIDD configuration response from the gateway device.

At block 508, the gateway device sends a monitoring event configuration request associated with the UE to the gateway device.

At block 510, the gateway device receives a monitoring event configuration response from the gateway device.

At block 512, the gateway device sends an on-boarding device response to the server. The on-boarding device response may indicate whether the UE is successfully on boarded.

Figure 6:
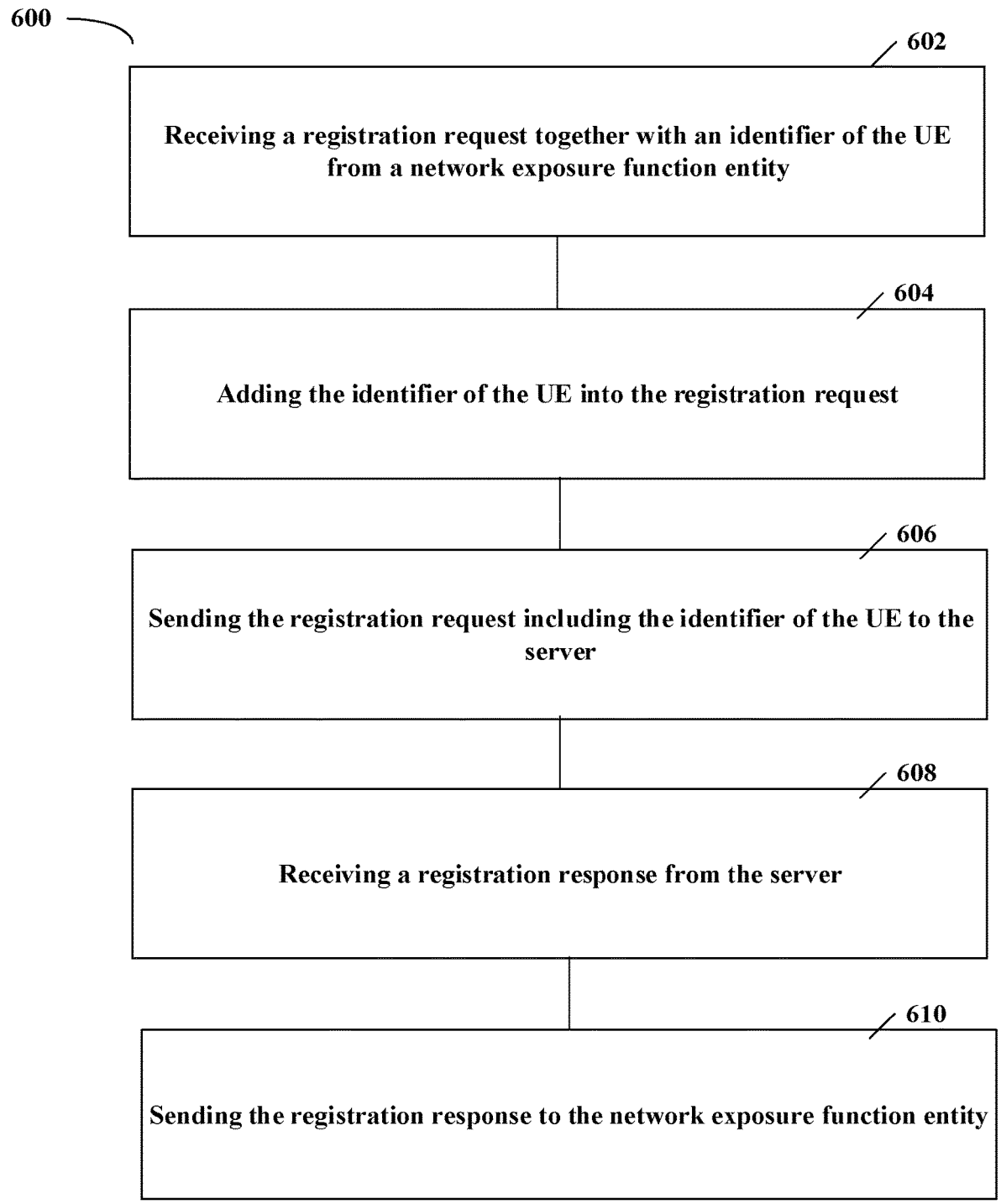
FIG. 6 shows a flowchart of a method according to another embodiment of the present disclosure.

FIG. 6 shows a flowchart of a method 600 according to an embodiment of the present disclosure, which may be performed by an apparatus implemented in or at a gateway device or communicatively coupled to the a gateway device. As such, the apparatus may provide means for accomplishing various parts of the method 600 as well as means for accomplishing other processes in conjunction with other components. Some blocks in FIG. 6 are related to the blocks of FIG. 3. For some parts which have been described in the above embodiments, detailed description thereof is omitted here for brevity.

At block 602, the gateway device receives a registration request together with an identifier of the UE from a network exposure function entity.

At block 604, the gateway device adds the identifier of the UE into the registration request.

At block 606, the gateway device sends the registration request including the identifier of the UE to the server.

At block 608, the gateway device receives a registration response from the server.

At block 610, the gateway device sends the registration response to the network exposure function entity.

Figure 7:
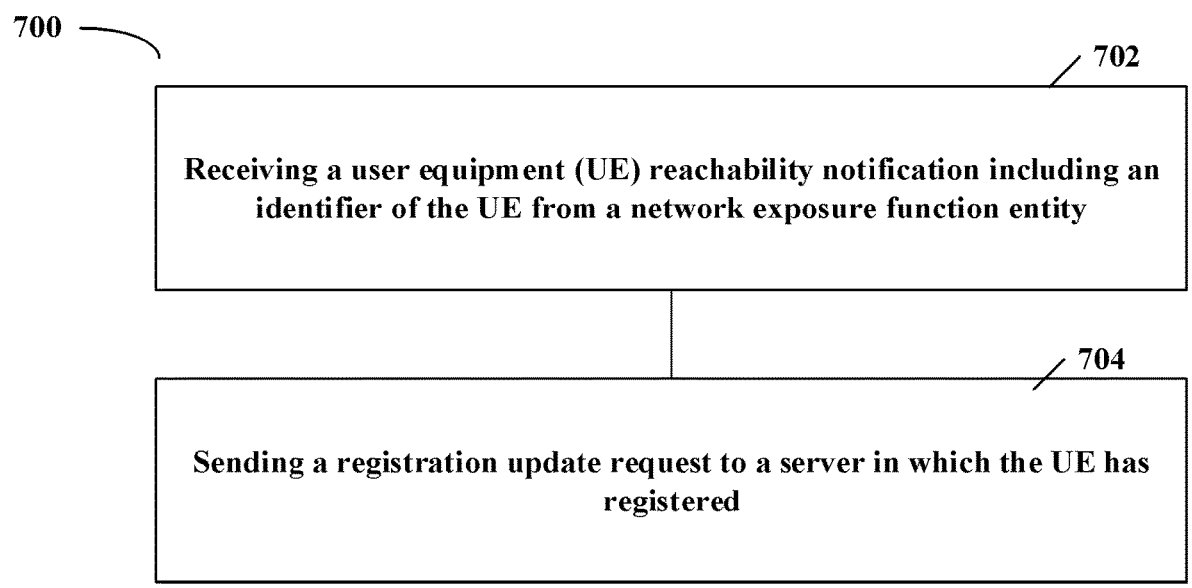
FIG. 7 shows a flowchart of a method according to another embodiment of the present disclosure.

FIG. 7 shows a flowchart of a method 700 according to an embodiment of the present disclosure, which may be performed by an apparatus implemented in or at a gateway device or communicatively coupled to the a gateway device. As such, the apparatus may provide means for accomplishing various parts of the method 700 as well as means for accomplishing other processes in conjunction with other components. Some blocks in FIG. 7 are related to the blocks of FIG. 4. For some parts which have been described in the above embodiments, detailed description thereof is omitted here for brevity.

At block 702, the gateway device receives a UE reachability notification including an identifier of the UE from the network exposure function entity.

At block 704, the gateway device sends a registration update request to the server in which the UE has registered. For example, Register Update Operation URL based on CoAP POST may be "/{location}?lt={Lifetime}&b={binding}&Q&sms={MSISDN}".

Figure 8:
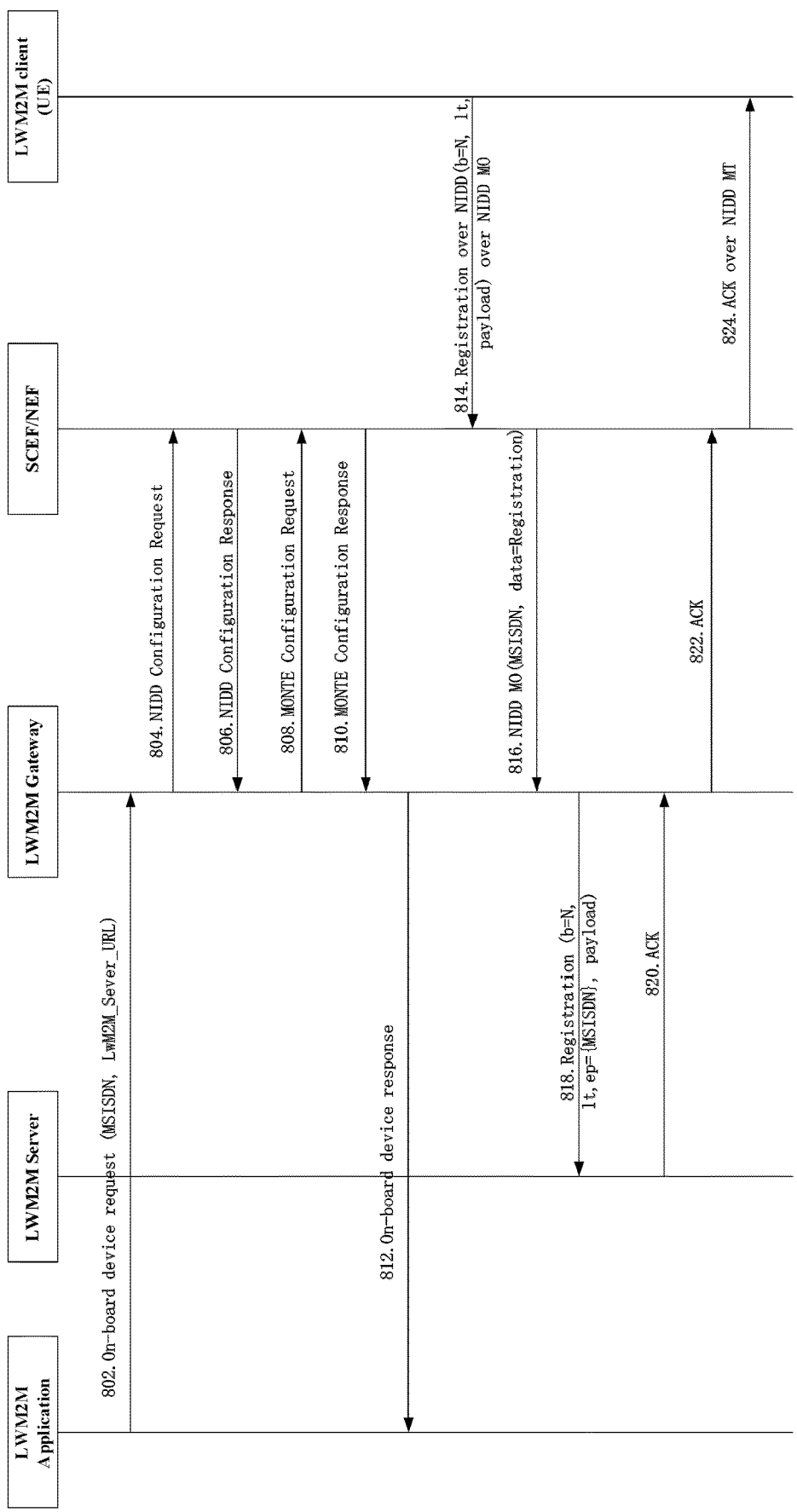
FIG. 8 shows a flowchart of a method according to another embodiment of the present disclosure.

FIG. 8 shows a flowchart of a method according to another embodiment of the present disclosure.

At step 802, LwM2M Application on-boards a UE as LwM2M Client by specifying the MSISDN and LwM2M Server URL.

At step 804, LwM2M Gateway sends a NIDD Configuration Request to SCEF/NEF in order to set up NIDD channel for the UE.

At step 806, SCEF/NEF sends a NIDD Configuration Response to LwM2M Gateway.

At step 808, LwM2M Gateway sends a Monitoring Event (MONTE) Configuration Request to SCEF/NEF in order to receive monitoring event notification from SCEF/NEF.

At step 810, SCEF/NEF sends a MONTE Configuration Response to LwM2M Gateway.

At step 812, LwM2M Gateway sends a response to confirm that UE is successfully on-boarded.

At step 814, the Non-IP Device as LwM2M Client sends a Registration Request over NIDD Mobile Originated (MO) message, specifying binding as Non-IP, initial lifetime and payload (typically objects and object instances) but not endpoint (in NIDD scenario, the endpoint is usually the MSISDN).

At step 816, SCEF/NEF forwards the Registration message to LwM2M, with UE's MSISDN as one of the request attributes.

At step 820, LwM2M Gateway gets the Registration message from SCEF/NEF MO message, parses it and appends the UE's MSISDN as endpoint option in the Registration message. This step increases the security level for LwM2M Registration since the endpoint is not claimed by the UE but gets it from 3GPP network.

At step 820, LwM2M Server sends acknowledgement to ack the registration.

At step 822, LwM2M Gateway sends the acknowledgement as a NIDD Mobile Terminated (MT) message.

At step 824, SCEF/NEF delivers the acknowledgement to the UE.

Figure 9:
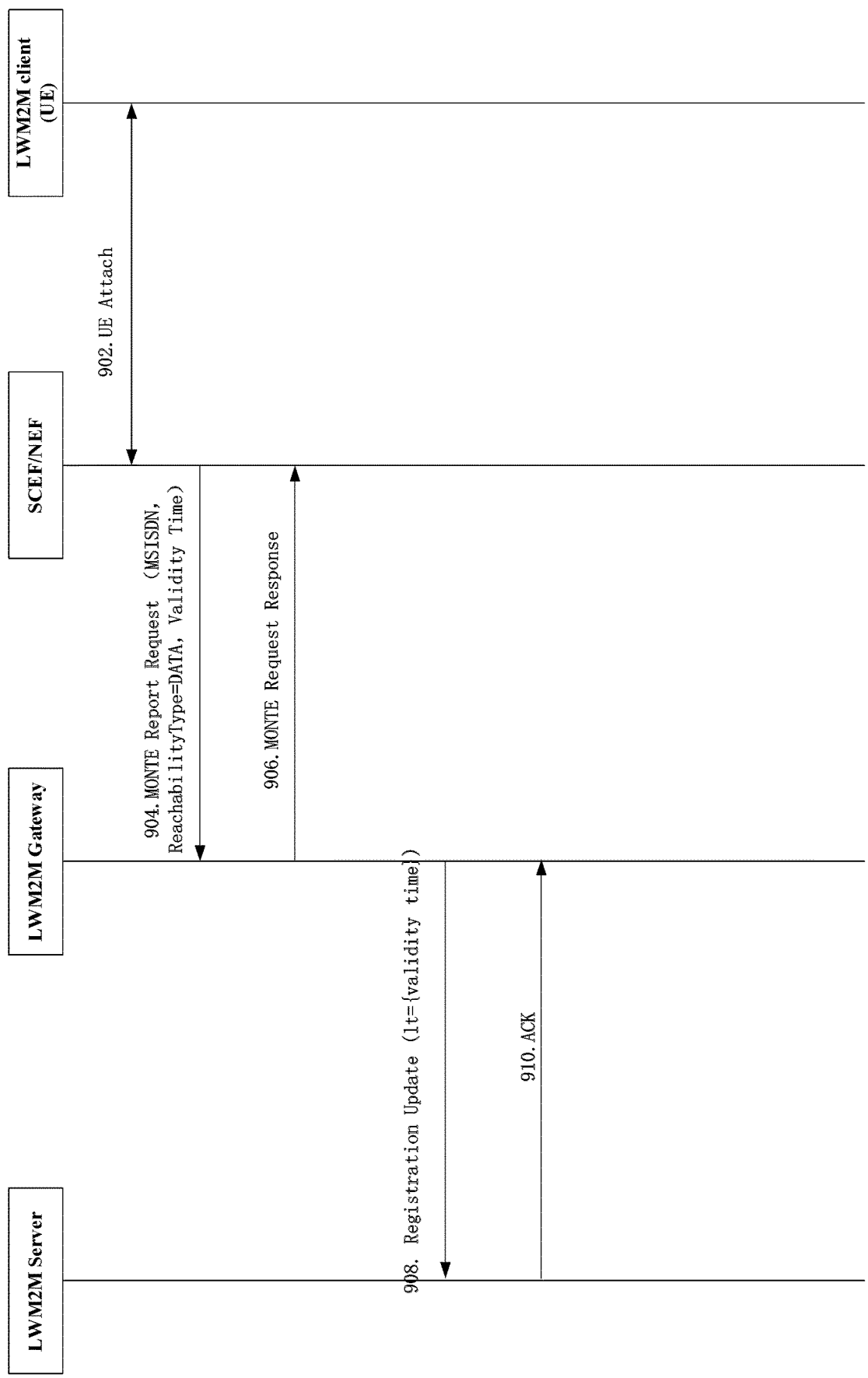
FIG. 9 shows a flowchart of a method according to another embodiment of the present disclosure.

FIG. 9 shows a flowchart of a method according to another embodiment of the present disclosure.

At step 902, UE attaches to the 3GPP network.

At step 904, SCEF/NEF sends a MONTE report request to LwM2M Gateway with MSISDN, reachability type and validity time.

At step 906, LwM2M Gateway sends a MONTE report response to SCEF/NEF.

At step 908, LwM2M Gateway sends a Registration Update on behalf of the UE, to extend the lifetime.

At step 910, LwM2M Server acknowledges (ACK) the Registration Update. LwM2M will terminate the ACK, not sending it to the UE.

In an embodiment, significant optimizations for IoT protocols such as LwM2M protocol can be done by leveraging the tight integration of SCEF with the core network.

In an embodiment, the strength and existing capabilities of the network and SCEF node can be used and does not solely depend on the device capabilities.

In an embodiment, the proposed solution can simplify the implementation of the LwM2M Client and Server by reusing the network capabilities.

In an embodiment, the proposed solution can improve the power consumption requirements of the constrained device thereby allowing it to operate for longer periods in the field with minimal maintenance.

Figure 10A:
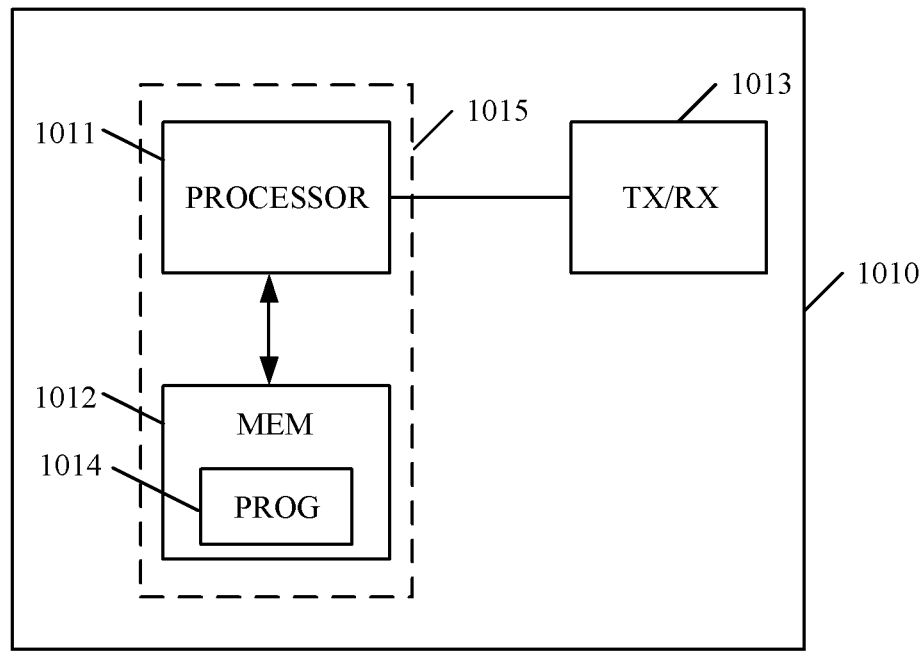
FIG. 10a illustrates simplified block diagrams of an apparatus according to an embodiment of the present disclosure.
Figure 10B:
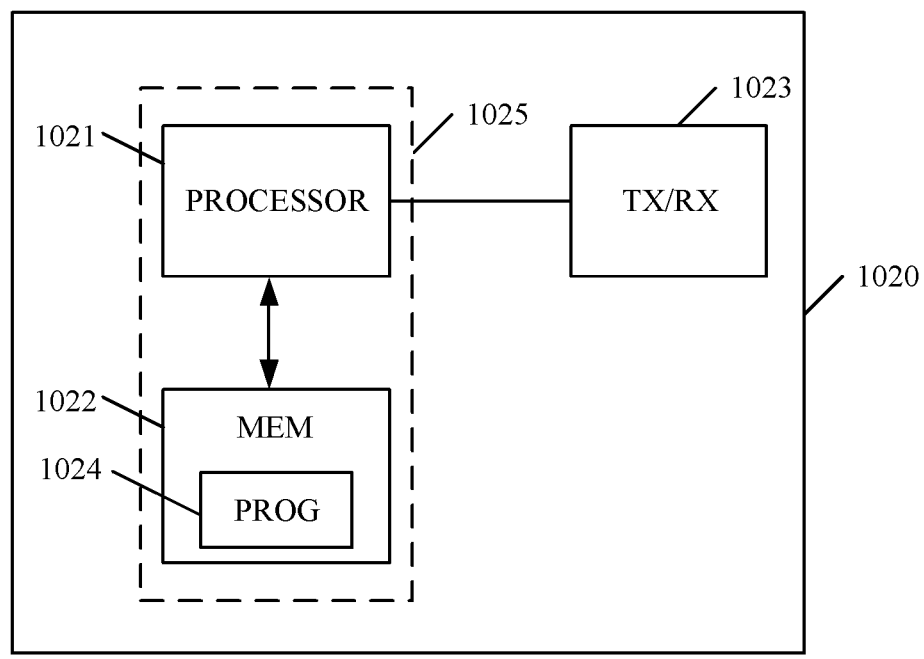
FIG. 10b illustrates simplified block diagrams of an apparatus according to another embodiment of the present disclosure.

In an embodiment, the proposed solution can simplify the bulk onboarding process for massive volume of devices by leveraging the existing network security and reduces complexity FIG. 10*a* illustrates a simplified block diagram of an apparatus 1010 that may be embodied in/as a network exposure function entity according to an embodiment of the present disclosure. FIG. 10*b* illustrates an apparatus 1020 that may be embodied in/as a gateway device according to an embodiment of the present disclosure.

The apparatus 1010 may comprise at least one processor 1011, such as a data processor (DP) and at least one memory (MEM) 1012 coupled to the processor 1011. The apparatus 1010 may further comprise a transmitter TX and receiver RX 1013 coupled to the processor 1011. The MEM 1012 stores a program (PROG) 1014. The PROG 1014 may include instructions that, when executed on the associated processor 1011, enable the apparatus 1010 to operate in accordance with the embodiments of the present disclosure, for example to perform the method related to the network exposure function entity as described above. A combination of the at least one processor 1011 and the at least one MEM 1012 may form processing means 1015 adapted to implement various embodiments of the present disclosure.

The apparatus 1020 comprises at least one processor 1021, such as a DP, and at least one MEM 1022 coupled to the processor 1021. The apparatus 1020 may further comprise a transmitter TX and receiver RX 1023 coupled to the processor 1021. The MEM 1022 stores a PROG 1024. The PROG 1024 may include instructions that, when executed on the associated processor 1021, enable the apparatus 1020 to operate in accordance with the embodiments of the present disclosure, for example to perform the method related to the gateway device as described above. A combination of the at least one processor 1021 and the at least one MEM 1022 may form processing means 1025 adapted to implement various embodiments of the present disclosure.

Various embodiments of the present disclosure may be implemented by computer program executable by one or more of the processors 1011 and 1021, software, firmware, hardware or in a combination thereof.

The MEMS 1012 and 1022 may be of any type suitable to the local technical environment herein and may be implemented using any suitable data storage technology, such as semiconductor based memory devices, magnetic memory devices and systems, optical memory devices and systems, fixed memories and removable memories, as non-limiting examples.

The processors 1011 and 1021 may be of any type suitable to the local technical environment, and may include one or more of general purpose computers, special purpose computers, microprocessors, digital signal processors DSPs and processors based on multicore processor architecture, as non-limiting examples.

According to an aspect of the disclosure it is provided a computer program product being tangibly stored on a computer readable storage medium and including instructions which, when executed on at least one processor, cause the at least one processor to carry out any of the methods related to the network exposure function entity as described above.

According to an aspect of the disclosure it is provided a computer program product being tangibly stored on a computer readable storage medium and including instructions which, when executed on at least one processor, cause the at least one processor to carry out any of the methods related to the gateway device as described above.

According to an aspect of the disclosure it is provided a computer-readable storage medium storing instructions which when executed by at least one processor, cause the at least one processor to carry out any of the methods related to the network exposure function entity as described above.

According to an aspect of the disclosure it is provided a computer-readable storage medium storing instructions which when executed by at least one processor, cause the at least one processor to carry out any of the methods related to the gateway device as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function or means that may be configured to perform one or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method at a network exposure function entity of a network, the method comprising the network exposure function entity:
   determining that a user equipment (UE) has attached to the network;
   sending a UE reachability notification including an identifier of the UE to a gateway device, the UE reachability notification being usable by the gateway device to send a registration update request to a server in which the UE has registered;
   receiving a registration request without an identifier of the UE from the UE, the registration request further including a binding mode of Non-Internet protocol (Non-IP), a lifetime of the registration, and a payload;
   sending the registration request together with the identifier of the UE to the gateway device, wherein the identifier of the UE is added by the gateway device into the registration request and the registration request including the identifier of the UE is sent by the gateway device to a server;
   receiving a registration response from the gateway device; and
   sending the registration response to the UE.

2. The method of claim 1, wherein the UE reachability notification includes a reachability type and/or a validity time.

3. The method of claim 2, wherein the reachability type indicates reachability for data.

4. The method of claim 2, wherein a lifetime of a registration included in the registration update request reachability type is set as a validity time.

5. The method of claim 1, wherein a lifetime of the registration included in the registration request is set as a predefined value indicating that the lifetime is infinity.

6. The method of claim 5, wherein the predefined value is 0.

7. The method of claim 1, further comprising:
   receiving a Non-IP data delivery (NIDD) configuration request for setting up a NIDD channel for the UE from the gateway device;
   sending a NIDD configuration response to the gateway device;
   receiving a monitoring event configuration request associated with the UE from the gateway device; and
   sending a monitoring event configuration response to the gateway device.

8. The method of claim 1:
   wherein the UE is a Lightweight Machine to Machine (LwM2M) device;
   wherein the network exposure function entity is a service capability exposure function (SCEF) entity or a network exposure function (NEF) entity; and
   wherein the gateway device is an LwM2M gateway device.

9. The method of claim 8, wherein the LwM2M gateway device is included in an LwM2M server.

10. The method of claim 1, wherein the identifier of the UE is a Mobile Station International Subscriber Directory Number (MSISDN).

11. A method at a gateway device, the method comprising the gateway device:

receiving a user equipment (UE) reachability notification including an identifier of the UE from a network exposure function entity;

sending a registration update request to a server in which the UE has registered;

receiving a registration request together with an identifier of the UE from a network exposure function entity, the registration request further including a binding mode of Non-Internet protocol (Non-IP), a lifetime of the registration, and payload;

adding the identifier of the UE into the registration request;

sending the registration request including the identifier of the UE to the server;

receiving a registration response from the server; and sending the registration response to the network exposure function entity.

12. The method of claim 11, wherein the UE reachability notification further includes a reachability type and/or a validity time, wherein the reachability type indicates reachability for data.

13. The method of claim 12, wherein a lifetime of the registration included in the registration update request reachability type is set as the validity time.

14. The method of claim 11, wherein a lifetime of the registration included in the registration request is set as a predefined value indicating that the lifetime is infinity.

15. The method of claim 11, further comprising:

receiving an on-boarding device request for on-boarding the UE from a server, wherein the on-boarding device request includes the identifier of the UE and the server's uniform resource locator (URL);

sending a Non-IP data delivery (NIDD) configuration request for setting up a NIDD channel for the UE to the gateway device;

receiving a NIDD configuration response from the gateway device;

sending a monitoring event configuration request associated with the UE to the gateway device;

receiving a monitoring event configuration response from the gateway device; and sending an on-boarding device response to the server.

16. An apparatus at a network exposure function entity, the apparatus comprising:

processing circuitry;

memory containing instructions executable by the processing circuitry whereby the apparatus is operative to:

determine that a user equipment (UE) has attached to the network; and send a UE reachability notification including an identifier of the UE to a gateway device, the UE reachability notification being usable by the gateway device to send a registration update request to a server in which the UE has registered;

receive a registration request without an identifier of the UE from the UE, the registration request further including a binding mode of Non-Internet protocol (Non-IP), a lifetime of the registration, and a payload;

send the registration request together with the identifier of the UE to the gateway device, wherein the identifier of the UE is added by the gateway device into the registration request and the registration request including the identifier of the UE is sent by the gateway device to a server;

receive a registration response from the gateway device; and send the registration response to the UE.

* * * * *